UNITED STATES PATENT OFFICE.

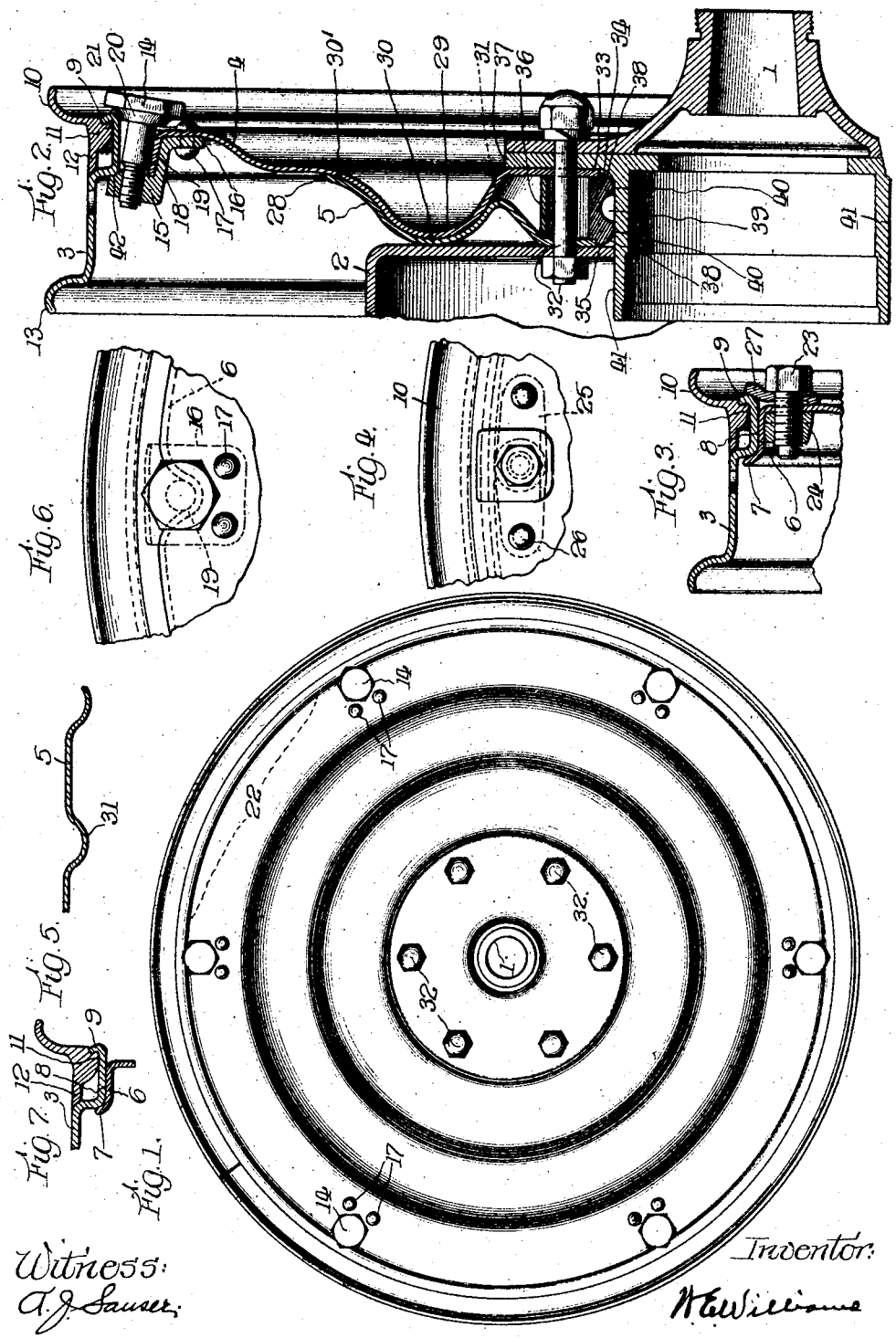

WILLIAM ERASTUS WILLIAMS, OF CHICAGO, ILLINOIS.

REENFORCED DISK WHEEL.

1,405,647.   Specification of Letters Patent.   Patented Feb. 7, 1922.

Application filed May 31, 1921. Serial No. 473,816.

*To all whom it may concern:*

Be it known that I, WILLIAM ERASTUS WILLIAMS, a citizen of the United States, a resident of Chicago, in the county of Cook and State of Illinois, have invented a new and useful Improvement in Reenforced Disk Wheels, of which the following is a specification.

My invention relates to metal wheels of the disk type used generally for automobiles wherewith rubber tires are used, and relates to what are known as demountable rim disk wheels and are adapted to fit on to the same hubs as artillery wooden spoked wheels.

The object of the invention is to produce a very light, strong, cheap and serviceable demountable rim disk wheel that may be applied to the ordinary hubs used with wooden wheels.

The invention is set forth in the claims.

Reference will be had to the accompanying drawing in which Figure 1 is a front elevation of the wheel.

Figure 2 is a radial section on an enlarged scale.

Figure 3 is a sectional detail through the rim, showing a modified form of the rim fastening.

Figure 4 is an elevation of the parts shown in Figure 3.

Figure 5 shows a section on the curved line concentric with the hub, passing through the point 31, Fig. 2, and showing the corrugations of the reenforcing disk 5.

Figure 6 is an enlarged detail of the rim fastening.

Figure 7 is a transverse detail through the margin of the disk.

In the drawing 1 indicates the hub of an ordinary wooden wheel here shown as being the rear hub for an automobile. 2 indicates the brake drum and 3 indicates the base or main body of the demountable rim. 4 indicates the main disk or web of the wheel and 5 indicates a reenforcing disk at the rear of the main disk 4. The main disk 4 is turned over into a seat 6 whereon the rim is supported. This seat 6 terminates in an outwardly projecting flange 7 which extends around the margin of the disk and furnishes the seat upon which rides the entire load of the demountable rim 3.

The rim 3 is provided with the inwardly projecting portion 8 which is seated upon the margin 6 of the rim. This portion 8 is turned over into a flange 9 which forms the retaining flange for the side ring 10. The side ring 10 is provided with the projection 11 which interlocks with the flange 9 and holds the side ring 10 in place. The said side ring is what is known as a split ring and on this account may be sprung out and into engagement with the flange 9 in the ordinary manner of rings of that type.

This side ring 10 is provided with a seat portion 12 which extends under the region of the tire bead and forms part of the tire seat and is in line with the tire seat of the main rim 3. The main rim section 3 is provided with a tire retaining flange 13 integral with the seat portion and thus forming a stiff marginal edge for the wheel. The rim member or section 3 with its side flange 10 is mounted and demounted on the seat 6 of the disk in the ordinary manner of a demountable rim and is held in place by means of the special inclined screws 14 which are screwed into special fixed nuts 15 having flanges 16 which are secured by rivets 17 to the disk, and said nuts 15 are provided with shoulders 42 which bear against the demountable rim in the same manner as the marginal flange 7 of the seat 6 of the disk. The bodies 18 of these special screws 14 rest in depressions 19 of the seat 6.

The screws 14 have the special curved seat 20 which fits snugly on to the base, or origin 21 of the flange 9 of the rim 3 and owing to the inclined position of the screws, as the screws 14 are tightened up they not only push the rim 3 closely against the seat 6 and against the flange 7, but they also expand the rim slightly, giving strong tension in the zones indicated by the dotted line 22 (see Figure 1) of the circumference of the disk.

When the screws are removed the disk springs free from the zone 22 or rather, is allowed to come back to its normal position of being slightly free on the zones 22 and thus may be easily removed. The zones 22 are substantially the spaces between the several screws 14, with the exception of a slight distance immediately adjacent to the screws. A modified form of the construction as shown by the screws 14 is illustrated by Figures 3 and 4, where the screws 23 are non-inclined and engage nuts 24 having flanges 25 fixed to the disk by rivets 26.

Under the screws 23 I use a series of clip blocks 27 which abut against the main rim and serve only to push the rim on to the seat 6 of the disk.

The main disk 4 is reenforced by a smaller disk 5, from its outer margin 28 to a circle at 29, fitting against the disk 4 to which it is fixed at intervals by riveting or spot welding at 30, 30'. A series of indentations 31 as indicated by Figures 2 and 5 occur in the reenforcing disk 5 at intervals between the hub bolts 32 to give a little more support to the main disk 4 at this point and to slightly stiffen the reenforcing disk 5 in the region where these depressions occur.

The central margin of the main disk 4 rests upon a shoulder of a hub ring 34, while the corresponding margin 35 of the disk 5 rests against a similar shoulder of the same ring.

A separator ring 36 spaces the main disk 4 and the reinforcing disk 5 to help sustain the thrust of the hub bolts 32.

The space between the brake drum 2 and the main flange 37 of the hub is the space ordinarily occupied by the spokes of a wooden wheel and thus I am enabled to put my disk into the same space between the hub flanges as may be occupied by the spokes, so that the same hub may be used for both types of wheels.

The hub ring 34 is rounded at both corners as indicated by 38 to adapt this ring to the various different types of hubs used with wooden wheels. These rounded corners 38 of the hub ring 34 permit the same ring to be used with different types of hubs for wooden wheels, as on the front wheels and with some makes of the rear wheels the main flange which acts the part of the flange 37 is at the rear or inside of the hub and thus by the arrangement of this ring 34 with its rounded corners 38 I may stock up the disks or rings to fit either front or rear flanges of hubs corresponding to the flange 37.

I manufacture these disks and send them to the different automobile replacement divisions to be put upon the same hubs as wooden wheels, suiting the wishes of the customer and it is desirable always to have the ring 34 a tight fit on the hub barrel and as these hubs sometimes vary slightly and the garage man or local dealer may not be equipped to fit the ring 34 by reboring it, I arrange the void 39 which provides for two small projections 40 in contact with the hub barrel 41 and I make these projections 40 of the smallest diameter permitted by the tolerances allowed the hub maker and then if the local garage man has trouble in getting the rings 34 or the wheel in which the ring is mounted, on to the hub barrel, he has only to file out the projections 40 a little bit with a hand file when he will be able to mount the disks with a tight fit on the hub barrel. This variation, due to filing that may be carelessly done is so little that it will not throw the wheel out of true to any noticeable extent and by this means of making a tight fit on the hub barrel I am permitted to allow the local replacement dealer to stock these wheels with the expectancy that he may successfully mount them when otherwise it might be risky to allow a local dealer to fit the disks in place of the wooden parts removed from the hubs.

The curved shapes of my main disk 4 and reinforcing disk 5 stiffen the parts and aid in the two pieces working as a unit to take the loads and shocks incident to the use of the wheel.

In place of the spot welding or riveting as I have indicated at the points 30 and 30' I may weld a seam around the margin of the disk 5 in the region of 28, thus uniting the two disks together at the margin of the reenforcing disk 5.

I may for certain classes of wheels omit the welding of the front disk 4 and reenforcing disk 5 at the points 30 and 30' as described as the chief function of the reenforcing disk 5 is to stiffen the wheel against skid shocks rather than direct radial loads.

The spacer ring 36 may be of rather thin metal and yet furnish a strut for the full strength of the bolts 32 which bolts bolt the wheel together at the hub.

What I claim is:

1. In a device of the class described, a disk wheel having the main disk portion reinforced on the back by a reinforcing disk and the two disks spread apart in the hub zone and provided with central apertures, a hub ring fitted into the apertures of both disks and provided with vertically and horizontally arranged shoulders adapted to register on the inner edges and inner sides of both disks and become both a spreader for the disks and a radial support therefor.

2. The combination with a hub body having circumferential flanges, of a main disk, a reinforcing disk secured in contact with the main disk at some distance from said body and spaced from the main disk, at a less distance from the body by a ring, and a series of bolts passing through the flanges, the spaced portions of the disks and the space within the ring, binding the parts rigidly together.

3. In a device of the class described, a main disk and a reinforcing disk fitted to each other in the region just outside of the hub and the two disks spread apart inside the hub flanges and provided with a separator ring separating the disks in the zone just outside of the bolt circle and a separating ring separating the disks on the inside of the bolt circle and this last ring also bearing on the barrel of the hub.

4. The combination with a hub having circumferential flanges, of a main disk laterally supported by a hub flange and laterally curved outside the zone of the flanges, a reenforcing disk spaced from the main disk in said zone by spaced concentric rings and fitting and fixed to the laterally curved portion of the main disk, and a series of bolts passing, between the spaced rings, through the hub flanges and the two disks.

5. In a wheel of the class described, a hub having a barrel to which the web of the wheel is attached and a disk adapted to fit on to the said barrel and provided with a hub bearing ring adapted to bear on the said hub barrel and said ring having relatively narrow contact points on the hub barrel separated from each other in annular formation.

6. In a disk wheel having a hub zone connection made of two disks separated from each other by two separator rings adapted to take the thrust of the hub clamping bolts and one of the said rings having shoulders adapted to take the radial thrust of the disk and also to take the separator thrusts.

7. In a device of the class described, a main disk and a reenforcing disk alined together in a zone outside of the hub flanges and separated from each other in the zone between the hub flanges; in combination with separator rings, one of which is adapted to take radial loads from the disks and to act as a spreader for the disks in the hub zone.

8. In a wheel of the class described, a main supporting front disk and a secondary reenforcing rear disk and the two disks alined together in the region immediately outside of the zone of the hub flanges and the secondary or reenforcing disk having stiffened corrugations at intervals around the margin of the zone adjacent to the hub flange.

9. In a wheel of the class described, a hub having a barrel to which the web of the wheel is attached and a disk adapted to fit on to the said barrel and provided with a hub bearing ring interposed between the disk and the hub barrel and said ring having a relatively narrow contact surface with the hub barrel.

Signed at Chicago, in the county of Cook and State of Illinois, this 21st day of May, 1921.

WILLIAM ERASTUS WILLIAMS.

Witnesses:
   B. J. BERNHARD,
   F. M. ZOBEL.